United States Patent [19]
Leake et al.

[11] Patent Number: 5,982,574
[45] Date of Patent: Nov. 9, 1999

[54] AUTOMATIC TRACKING FREQUENCY SERVO DEMODULATION TECHNIQUE FOR DVCR APPLICATIONS

[75] Inventors: William W. Leake, Eagan; Salman Mazhar, Minneapolis; Marius Dina, Burnsville, all of Minn.; Graham Teague, Eiselfing, Germany

[73] Assignee: VTC Inc., Bloomington, Minn.

[21] Appl. No.: 08/953,190

[22] Filed: Oct. 17, 1997

[51] Int. Cl.[6] .................................................. G11B 5/584
[52] U.S. Cl. ..................................... 360/77.12; 360/77.15
[58] Field of Search ....................... 360/75, 77.12–77.15, 360/77.05; 329/304

[56] References Cited

U.S. PATENT DOCUMENTS

| | | | |
|---|---|---|---|
| 4,172,265 | 10/1979 | Sakamoto et al. | 360/70 |
| 4,300,020 | 11/1981 | Toyomaki | 381/4 |
| 4,694,326 | 9/1987 | Demmer | 348/508 |
| 5,588,025 | 12/1996 | Strolle et al. | 375/316 |
| 5,621,478 | 4/1997 | Demmer | 348/639 |
| 5,854,714 | 12/1998 | Reed et al. | 360/51 |

Primary Examiner—William J. Klimowicz
Attorney, Agent, or Firm—Kinney & Lange

[57] ABSTRACT

An apparatus for demodulating two pilot tones for use by a servo control for a magnetic read head is disclosed. The apparatus provides positioning information to position the read head adjacent to a desired information track of a magnetic storage medium. The apparatus comprises a first and a second pilot tone demodulation unit. Each pilot tone demodulation unit comprises a band pass filter for providing a first filtered output signal having an amplitude and a phase representative of the first and the second frequency pilot tones, respectively. A delay lock loop receives the first filtered out of the band pass filter and determines a phase of the frequency pilot tone. A multiplier is connected to the output of the band pass filter and the output of the delay lock loop for multiplying the frequency pilot tone with the output signal of the delay lock loop. A low pass filter is connected to the output of the multiplier for filtering out undesired signals and for passing a DC signal. A comparator is used for comparing the first DC signal to the second DC signal and for determining a position of the magnetic read head with respect to a track of a magnetic storage medium.

16 Claims, 4 Drawing Sheets

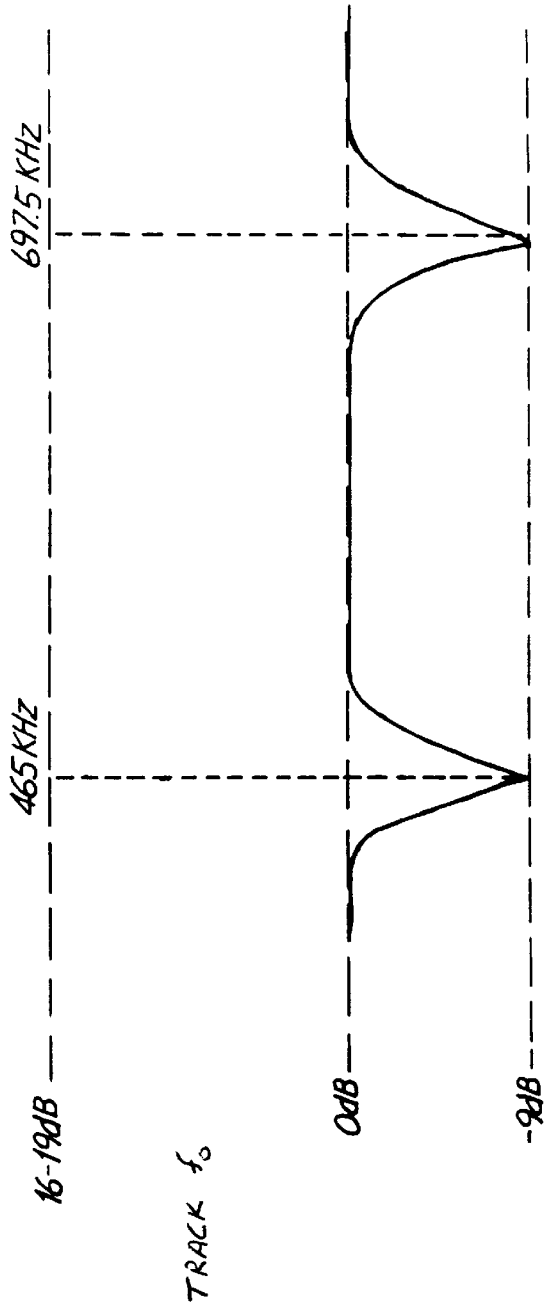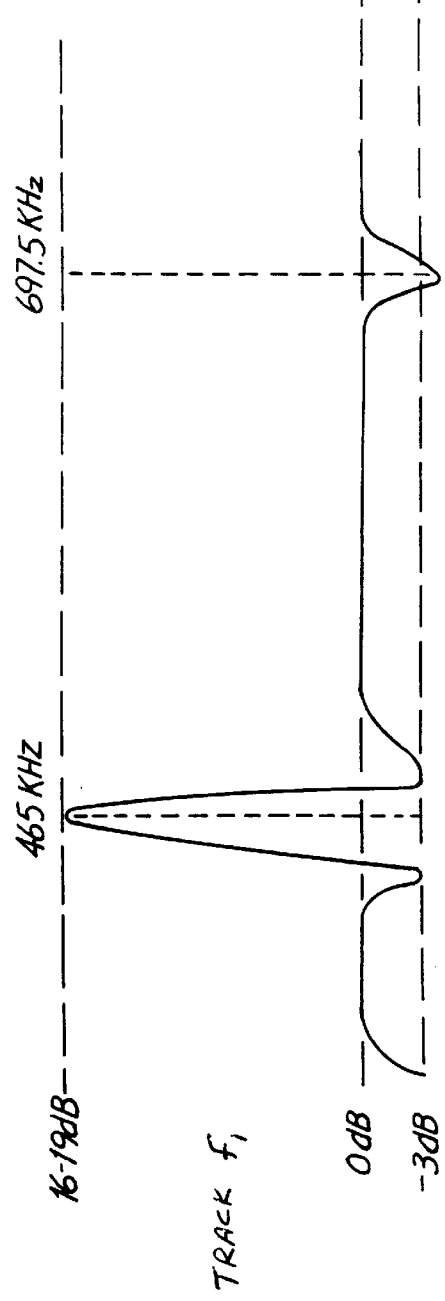

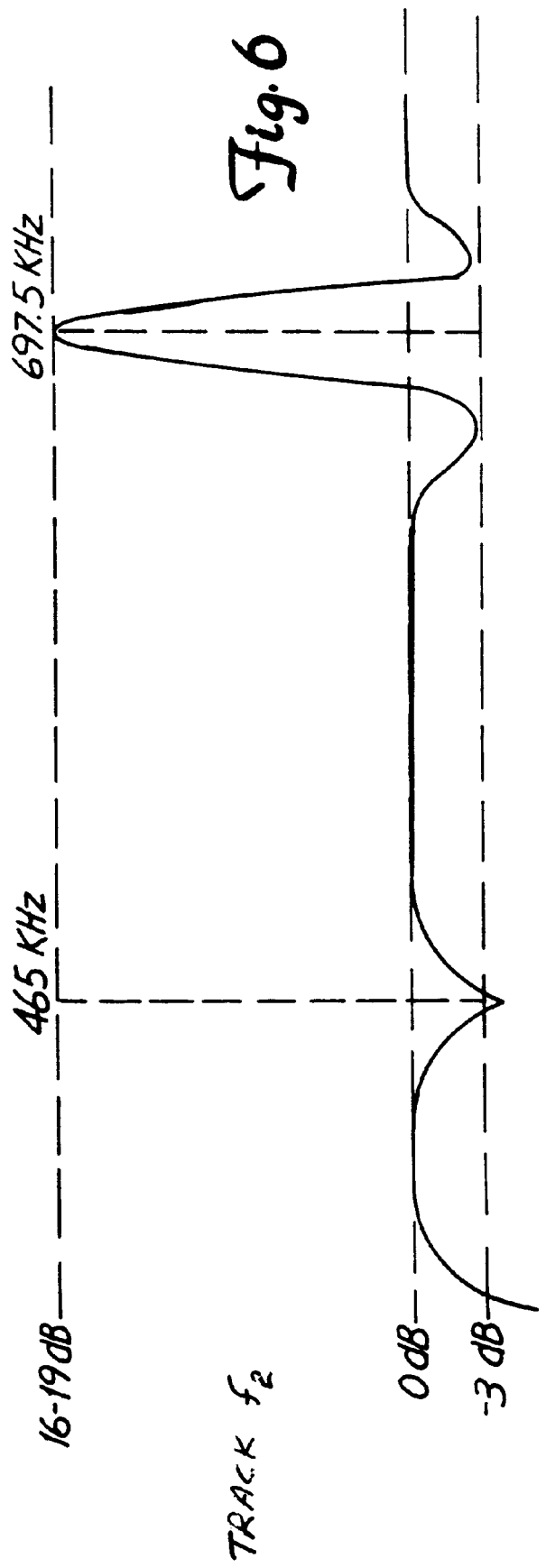

AUTOMATIC TRACKING FREQUENCY SERVO DEMODULATION TECHNIQUE FOR DVCR APPLICATIONS

BACKGROUND OF THE INVENTION

The present invention is an electronic circuit for demodulating servo information read from a magnetic storage medium. More specifically, the present invention is a demodulation circuit used in a digital video cassette recording system for demodulating embedded frequency modulated servo schemes from a magnetic storage medium, and thereby determining the position of a read head with respect to a specific track of the magnetic storage medium.

A video cassette can include two types of information on the magnetic storage medium, such as a magnetic tape. First, the storage medium can include data information which can be written to or read from the storage medium by electrical circuitry within a video cassette recorder (VCR) and which can be manipulated by the electrical circuitry within the VCR to recover the data from the storage medium. Second, the video cassette can include servo information, which is information which can be recovered from the magnetic storage medium by electrical circuitry within the VCR to monitor and position a read head of the VCR. The servo information is utilized by the VCR to position and center the read head above the desired track of data information on the magnetic storage medium such that the read head will properly read the data from the track. If the read head is not properly centered over the desired track of the magnetic storage medium, circuitry within the VCR will utilize the servo information to alter the position of the read head such that it is properly centered above the desired track.

Presently there are two positions on a magnetic storage medium in which servo information is written. First, servo information can be written at the beginning of each track of the magnetic storage medium. In this type of system, the servo information is also called servo bursts, meaning that there is a burst of information positioned at the beginning of each track containing no data information, just servo information. These servo burst areas are a source of interruption to data information storage.

Second, servo information can be written on alternating tracks such that a first track would include data as well as embedded servo information and a second track would include data information only. While reading down the data-only track the read-head can also read the embedded servo information on the two adjacent tracks as a fringing field. This information is then used to center the read-head on the track. The technique of storing and subsequently recovering servo information from alternating tracks has become the standard in digital video cassette recording systems.

One type of prior art VCR system uses high-Q or very tight bandpass, continuous-time filters to extract servo information from the recovered data. Given the typical component tolerances in any standard silicon IC fabrication process, a high-Q bandpass, continuous-time filter is usually difficult to control. In order to achieve accurate control over parameters such as the filter cut-off frequency, elaborate control circuitry needs to be included on the same chip. The resulting system complexity is often high leading to an increase in the overall cost as well as power consumption. An alternate is to emulate the filtering function using Digital Signal Processing (DSP) technique. However, this alternative also results in an unacceptably high-cost high-complexity implementation for most applications. Yet another option is to lock onto the frequency-modulated servo information using a Phase-Locked Loop (PLL). For such a system to function, the PLL circuitry needs to have a very narrow lock-range leading to an unacceptably long transient response time for the overall system.

Therefore, there is a need for an automatic tracking frequency servo demodulation technique for digital VCR applications which is not hardware intensive and which provides a relatively fast response.

BRIEF SUMMARY OF THE INVENTION

The present invention is an automatic tracking frequency servo demodulation circuit for digital VCR applications. The circuit utilizes a delay lock loop, which is a modification of a phase lock loop. The circuitry, including the delay lock loop, provides for a fast response time and satisfies the narrow lock range needed to reject all frequencies other than the desired tone.

The present invention provides an electric circuit for demodulating two pilot tones and utilizing the demodulated tones to servo control a magnetic read head. Electrical circuit comprises a first voltage gain amplifier for electrically receiving an input signal and for providing an output signal having an increased amplitude. The output of the first voltage gain amplifier is fed into a first and a second pilot tone demodulation unit. Each pilot tone demodulation unit comprises a first band pass filter for providing a first filtered output sinusoidal signal having an amplitude and a phase representative of the first and the second frequency pilot tone, respectively; a voltage gain amplifier connected to the band pass filter for receiving the frequency pilot tone and for providing the frequency pilot tone with an increased amplitude; a delay lock loop for determining a phase of the frequency pilot tone; a multiplier connected to the output of the voltage gain amplifier and the output of the delay lock loop for multiplying the frequency pilot tone with the output signal of the delay lock loop at zero degrees phase shift; a low pass filter connected to the output of the multiplier for filtering out undesired signals; and a voltage gain amplifier connected to the output of the low pass filter for receiving the DC signal and for providing an amplified DC signal. The amplified DC signals are compared using a comparator to determine the position of the magnetic read head with respect to a track of a magnetic storage medium.

BRIEF DESCRIPTION OF THE DRAWINGS

FIG. 4 is a graph depicting a plot of information written on a data information track.

FIG. 5 is a graph depicting a plot of the information written on a servo track positioned on a first side of a data information track.

FIG. 6 is a graph depicting a plot of the information written on a servo track positioned on a second side of a data information track.

DETAILED DESCRIPTION OF THE PREFERRED EMBODIMENTS

The present invention is a demodulation circuit used in a digital video cassette recording system for demodulating embedded frequency modulated servo schemes from a magnetic storage medium, and thereby determining the position of a read head with respect to a specific track of the magnetic storage medium.

Figure 1:
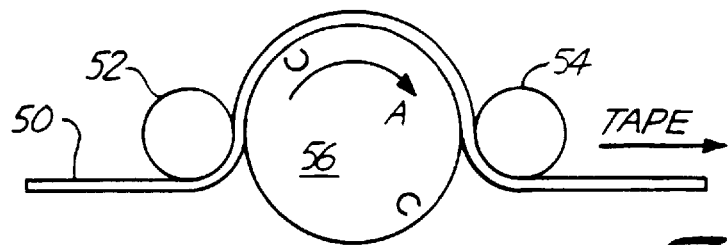
FIG. 1 is a top view showing a magnetic storage medium (tape) rotating about a set of heads of a video cassette recorder (VCR).
Figure 2:
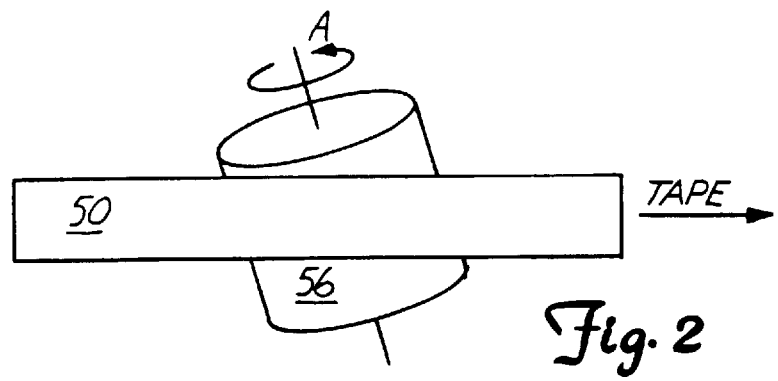
FIG. 2 is a side view of a magnetic storage medium (tape) passing a head of a VCR.
Figure 3:
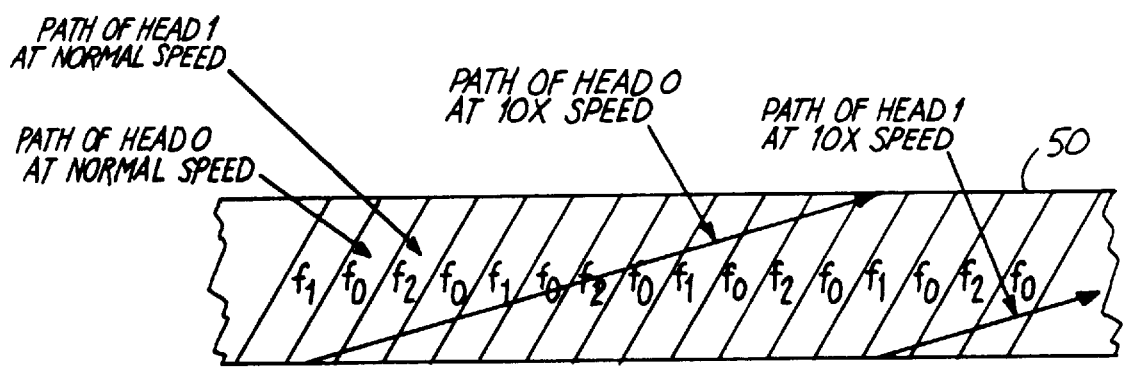
FIG. 3 is a front view of a portion of a magnetic storage medium (tape) showing a plurality of tracks of the magnetic storage medium.

The automatic tracking frequency (ATF) of the present invention provides demodulation of two pilot tones used for servo control of the read head position of the video cassette recorder (VCR). FIG. 1 is a top view showing a portion of magnetic storage medium or tape 50 rotating about heads 52 and 54 positioned adjacent slider 56 used in a VCR read or write operation. FIG. 2 is a side view of a portion of magnetic tape 50 passing slider 56 during a read or write operation. FIG. 3 is a front view of a portion of magnetic tape 50 showing a plurality of tracks $f_0$, $f_1$ and $f_2$.

Heads 52 and 54 are mounted on scanner 56 which rotates heads 52 and 54 as magnetic tape 50 pass by at an angle to scanner 56 and heads 52 and 54 to produce a series of diagonal tracks $f_0$, $f_1$ and $f_2$ on magnetic tape 50. Alternating tracks are written with alternating heads. All tracks written with head 52 are denoted $f_0$ while tracks written with head 54 are denoted either $f_1$ or $f_2$. Each head 52 and 54 writes with a different azimuth angle to minimize high frequency crosstalk between tracks $f_0$, $f_1$ and $f_2$.

Head 52 writes information exclusively to tracks $f_0$. The information written by head 52 to tracks $f_0$ consists of data information which can be later manipulated by electrical circuitry within the VCR during a read operation to recover the data from magnetic tape 50. Conversely, head 54 exclusively writes information to either tracks $f_1$ or $f_2$. The information written by head 54 to tracks $f_1$ and $f_2$ consists of servo information in addition to the data. Servo information is used by automatic tracking frequency system 100 shown in FIG. 7 located within a VCR to position and center a read head adjacent a desired track of data information (i.e. center head 52 adjacent one of the $f_0$ tracks) of magnetic tape 50. Circuitry within the VCR will utilize the servo information to alter the position of the read head if necessary such that the read head is properly centered adjacent a desired track of data information.

As shown in FIGS. 1 and 2, magnetic tape 50 passes slider 56 in the direction shown by the arrow labeled "tape." As magnetic tape 50 passes slider 56, slider 56 rotates in the direction shown by arrow A. As shown in FIG. 1, the tape passes between head 52 and slider 56 and also passes between slider 56 and head 54. The side view in FIG. 2 shows magnetic tape 50 passing slider 56 such that tape 50 is at an angle to slider 56. Heads 52 and 54 have been removed from this side view for clarity purposes. The angle between magnetic tape 52 and slider 56 is necessary for heads 52 and 54 to produce the series of diagonal tracks $f_0$, $f_1$ and $f_2$ shown in FIG. 3.

FIGS. 4–6 each include a graph depicting a plot of information written on data information track $f_0$, servo information track $f_1$ and servo information track $f_2$, respectively. As shown in FIGS. 4–6, the data spectrum written on tracks $f_0$, $f_1$ and $f_2$ is relatively flat with the exception of two 50 kHz wide notches placed at two pilot distinct frequencies, 465 kHz and 697.5 kHz, which are derived by dividing a 41.85 MHz reference frequency clock standard in most VCRs by either 60 or 90. The specific location of these two 50 kHz wide notches is not critical. Rather, it is only necessary that the frequency of these notches be precisely known. The values of 465 kHz and 697.5 kHz have been chosen in this application because these values are integer divisibles of the reference frequency clock. Any other frequency could be chosen without varying from the present concept.

On track $f_0$ the notches are approximately 9 dB deep. On tracks $f_1$ and $f_2$ the notches are approximately 3 dB deep. A16–19 dB tone is mixed into the data at 465 kHz on track $f_1$, and at 697.5 kHz on track $f_2$. These frequencies are low enough to be read by head 52 on adjacent track $f_0$, so, as head 52 reads track $f_0$, a fringe field from both tracks $f_1$ and $f_2$ will also be read. By comparing the relative magnitude of the 465 kHz tone from track $f_1$ with the 697.5 kHz tone from track $f_2$, electrical circuitry within the VCR can determine the precise location of head 52 with respect to track $f_0$. For example, if the magnitude of the fringe field from the 465 kHz tone is greater than the fringe field from the 697.5 kHz tone, then head 52 is not properly centered adjacent to track $f_0$. Rather, head 52 is closer to track $f_1$ than track $f_2$. Once this has been determined, the position of head 52 can be servoed to stay in the middle of track $f_0$.

The 465 kHz and 697.5 kHz tones are mixed into the data by controlling the encoding and scrambling of the data written. At the beginning of each track there is a preamble where the magnitude of the tones is approximately 10 dB higher than on the rest of the track. This area is referred to as the burst and lasts approximately 88 μs. The magnitude of the fringe field read on track $f_0$ is approximately 6 dB lower than that read on tracks $f_1$ and $f_2$. During normal tracking both the burst and normal region are read and used for servoing. During search mode (also known as trick more), the tape is moved from 2× to 20× faster than in normal mode. A 10× mode is shown in FIG. 3 by arrows. Only the 88 μs burst area in the beginning of tracks $f_1$ and $f_2$ is used by the servo system in search mode. A third mode, known as edit mode, exists where only the burst region of track $f_0$ is read so that the remainder of the track can be overwritten with new data.

Figure 7:
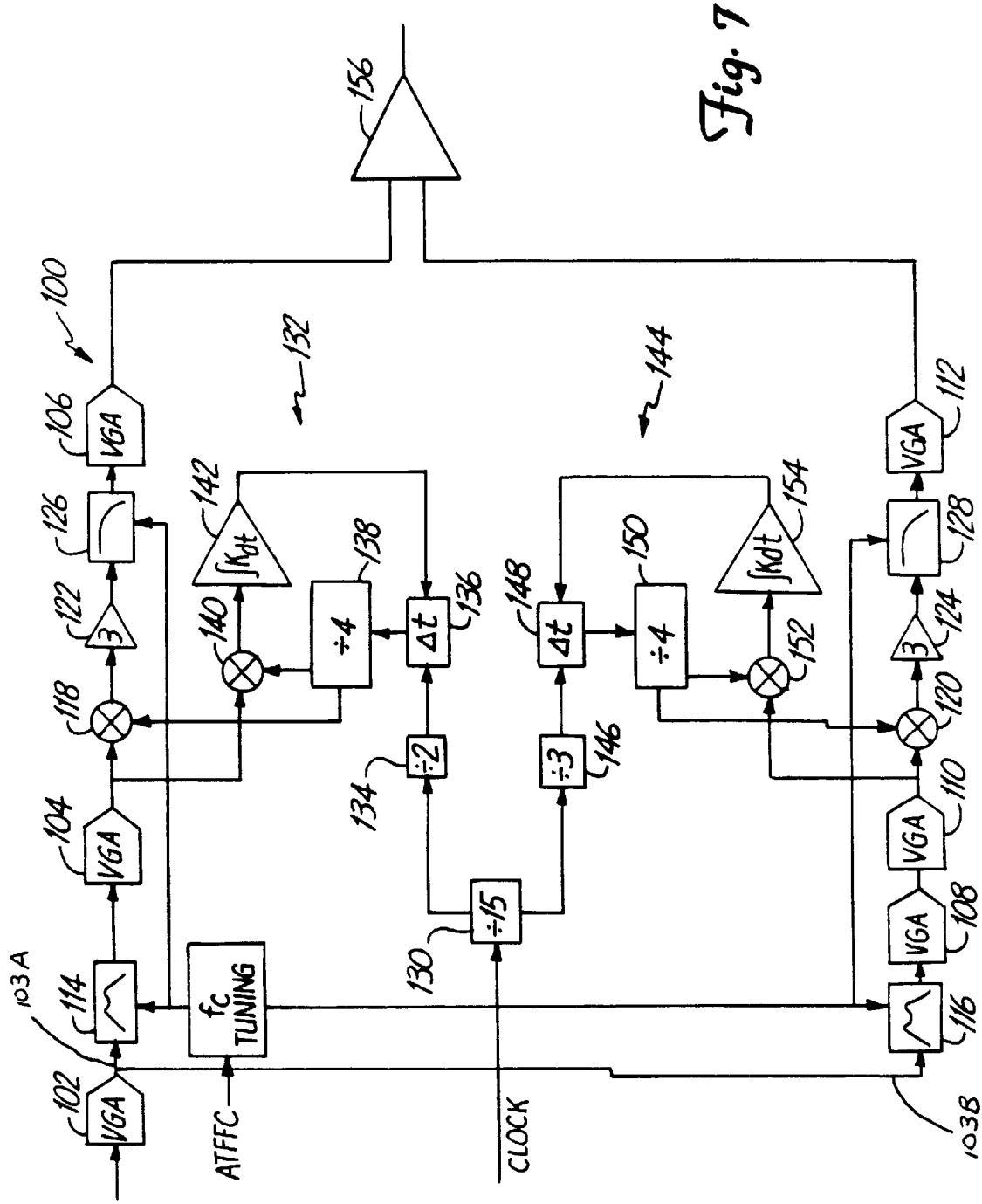
FIG. 7 is a block diagram of the automatic tracking frequency system used in the present invention.

A block diagram of automatic tracking frequency system 100 is shown in FIG. 7. As shown in FIG. 7, automatic tracking frequency system 100 includes voltage gain amplifiers 102, 104, 106, 108, 110 and 112, bandpass filters 114 and 116, multipliers 118 and 120, step-ups 122 and 124, lowpass filters 126 and 128, clock frequency divide down 130, delay lock loop 132 comprising divide down 134, variable delay cell 136, divide down 138, multiplier 140 and integrating loop filter 142, delay lock loop 144 comprising divide down 146, variable delay cell 148, divide down 150, multiplier 152 and integrating loop filter 154, and comparitor 156.

As previously discussed, head 52 reads information from track $f_0$. Track $f_0$ contains data information which can later be manipulated by electrical circuitry within the VCR during a read operation to recover the data from magnetic tape 50. During a read operation, head 52 also reads a fringe field from both tracks $f_1$ and $f_2$. Input signal 101, shown in FIG. 7, represents the combined signal read by head 52.

As shown in FIG. 7, signal 101 passes through an initial gain stage via voltage gain amplifier 102 and is then split into two virtually identical paths 103A and 103B, one for the 465 kHz low pilot tone (path 103B), and the other for the 697.5 kHz high pilot tone (path 103A). Bandpass filters 114 and 116 are used in each path to improve the signal to noise ratio of the low-level tones of signal 101. In addition, bandpass filters 114 and 116 substantially filter out all signals except for desired pilot tone, i.e. either the 697.5 kHz pilot tone in path 103A or the 465 kHz pilot tone in path 103B. Bandpass filter 114 filters out all signals except for 697.5 kHz pilot tone, while bandpass filter 116 filters out all signals except for 465 kHz pilot tone.

The output of bandpass filters 114 and 116 are amplified by voltage gain amplifiers 104 and 108, respectively. Voltage gain amplifiers 104 and 108 have nominal values which are user programmable and are automatically switched by approximately 6 dB during a search (or trick) mode. Voltage gain amplifiers 104 and 108 increase the signals coming out of bandpass filters 114 and 116, respectively, necessary for manipulation by multipliers 118, 120, 140 and 152. The 465 kHz pilot tone path (path 103B) has another voltage gain amplifier 110 which allows the user to increase the low tone signal by between approximately 2.0 dB and 7.0 dB to compensate for a channel response of the low tone relative to the high tone. Preferably, voltage gain amplifier 110 increases the low signal tone by approximately 4.5 dB.

Two delay lock loops 132 and 144 are used to pick the pilot tones out of the data spectrum using the automatic tracking frequency system clock, frequency divide downs 130, 134 and 146, variable delay cells 136 and 148, frequency divide down 138 and 150, analog multipliers 140 and 152 and integrating loop filters 142 and 154. In the present embodiment, the automatic tracking frequency system clock (83.7 MHZ) runs at twice the general system clock (41.85 MHZ) of the VCR so that the proper divide ratios can be created in the automatic tracking frequency system 100. Analog multipliers 118 and 120 mix the output signal of voltage gain amplifiers 104 and 110 with the clock of delay lock loops 132 and 144 and outputs the sum and the difference frequencies, as well as a DC component. The output of multipliers 118 and 120 are increased by a factor of three by amplifiers 122 and 124. This amplification is necessary in the present embodiment only to ensure that lowpass filters 126 and 128 can properly filter out the higher order harmonics. Thus, amplifiers 122 and 124 are not critical elements of the present invention. The DC component of the mixed signal is extracted by the low-pass filters 126 and 128 having a cutoff frequency which can be varied from approximately 5 to 35 kHz, thus passing only frequencies within a narrow range of the frequency of delay lock loops 132 and 134. Voltage gain amplifiers 106 and 112 boost the level of the low tone by a user-programmable amount which automatically switches by approximately 10 dB in search (trick) and edit modes. The two amplified DC components from amplifiers 106 and 112 can then be compared by comparitor 156.

In one preferred embodiment, voltage gain amplifiers 102, 104, 106, 108, 110 and 112 are input programmable and permit a user to customize the gain differently for each head. The value of the gain $A_v$ of voltage gain amplifiers 102, 104, 106, 108, 110 and 112 are given by the following equation:

$$A_v = 4.0 + 1.33 K$$

where K is the value of either the ATGCH0 or ATGCH1 pin register setting of the particular amplifier which can vary form 0 to 31. This allows the gain to vary over the entire 20 dB 30–300 mV input range. Bandpass filters 114 and 116 each have a signal input limit of 1.2V to maintain linearity and the user must be careful to set the ATGC registers of the amplifiers to the appropriate values so that an adequate signal level is obtained without overranging the input of bandpass filters 114 and 116.

In one preferred embodiment, bandpass filters 114 and 116 are implemented as a $4^{th}$ order Chebyshev leapfrog design centered at the tone frequency with a Q of 4.5. Q is a numerical factor without any units, since it is a ratio of two resistors. There is no more than 0.5 dB ripple in the passband, defined as the region between the −0.5 dB rolloff frequencies, and has a roll-off of greater than 40 dB/decade. Bandpass filters 114 and 116 each have a tuning network which compensates for process, temperature, power supply and recovered clock frequency variations.

Bandpass filters 114 and 116 each have a variable gain stage (voltage gain amplifiers 102, 104 and 106) before and after it to allow the user to compensate for variations in the amplitude of the signal. In one preferred embodiment, voltage gain amplifier 102 should be set to provide a 1.2V input signal to bandpass filters 114 and 116. The signal out of bandpass filters 114 and 116 will be on the order of millivolts. This signal needs to be amplified to 250 mV to yield the proper loop gain necessary for delay lock loops 132 and 144, since the delay lock loop gain is signal dependent.

Delay lock loops 132 and 144 are designed with an accurate center frequency and a restricted lock range to lock onto a specific input frequency embedded in a spectrum of noise. The loops used consist of analog multiplier 140 and 152, integrating loop filters 142 and 154, variable delay circuits 136 and 148, divide-by-4 circuits 138 and 150, and timing recovery clock divided downs 130, 134 and 146. Divide-by-4 circuits 138 and 150 is needed so that a quadrature component 90° out of phase can be generated. The divided down clock frequency is fixed and only the phase is varied through the one-shot variable delay cells 136 and 148. The analog delay cell is controlled by the analog voltage output by the integrating loop filter, thus completing the loop.

An output signal of an analog multiplier will go to zero when the two input signals are 90° out of phase, and have a maximum output proportional to the signal amplitude at the sum and difference frequencies of the two inputs when the two inputs are in phase. By using two multipliers for each signal (118 and 140, 120 and 152) wherein multipliers 140 and 152 are set to 0° and used to lock onto the proper frequency and phase, and wherein multipliers 118 and 120 are set to −90°, a signal can be generated with a level proportional to the input signal amplitude at the loop frequency. Only difference signals within the lowpass cutoff frequency of delay lock loops 132 and 144 frequency will be output. The loop bandwidth (or loop gain) of delay lock loops 132 and 144 is set by lowpass filters 126 and 128 so the 465 kHz and 697.5 kHz tones will always be passed.

As described herein, the present invention provides a demodulation circuit used in a digital video cassette recording system which will demodulate embedded frequency modulated servo schemes to accurately determine the location of a read head with respect to a track of information on a magnetic tape.

Although the present invention has been described with reference to preferred embodiments, workers skilled in the art will recognize that changes may be made in form and detail without departing from the spirit and scope of the invention.

We claim:

1. An apparatus for demodulating a first and a second pilot tone for use by a servo control to position a read head adjacent to a desired information track of a magnetic storage medium, the apparatus comprising:

an input for receiving a servo input signal from the magnetic storage medium;

a first pilot tone demodulation unit comprising:
a first band pass filter responsive to the servo input signal for providing a first filter output signal having an amplitude and a phase representative of the first pilot tone;
a first delay lock loop for determining the phase of the first pilot tone, the first delay lock loop having an initial input frequency signal equal to a multiple of the first pilot tone, the first delay lock loop providing a series of output signals, each output signal having an amplitude equal to the amplitude of the first pilot tone and having a phase;

a first multiplier responsive to the output of the first band pass filter and the output of the first delay lock loop for multiplying the first pilot tone by a clock generated by the first delay lock loop and for providing a first DC signal having an amplitude representative of a relative phase between the first pilot tone and the clock generated by the first delay lock loop; and a first low pass filter responsive to the output of the first multiplier for passing the first DC signal;

a second pilot tone demodulation unit comprising:

a second band pass filter responsive to the servo input signal for providing a second filter output signal having an amplitude and a phase representative of the second pilot tone;

a second delay lock loop for determining the phase of the second pilot tone, the second delay lock loop having an initial input signal frequency equal to the second pilot tone, the second delay lock loop providing a series of output signals, each output signal having an amplitude equal to the amplitude of the second pilot tone and having a phase;

a second multiplier responsive to the output of the second band pass filter and the output of the second delay lock loop for multiplying the second pilot tone by a clock generated by the second delay lock loop and for providing a second DC signal having an amplitude representative of a relative phase between the second pilot tone and the clock generated by the second delay lock loop; and a second low pass filter responsive to the output of the second multiplier for passing the second DC signal; and a comparator for comparing the first DC signal to the second DC signal.

2. The apparatus of claim 1 wherein the first multiplier multiplies the first pilot tone by the output signal of the first delay lock loop at zero degrees phase shift.

3. The apparatus of claim 1 wherein the second multiplier multiplies the second pilot tone by the output signal of the second delay lock loop at zero degrees phase shift.

4. The apparatus of claim 1 wherein the first delay lock loop further comprises:

a first variable delay cell;

a first divider for receiving an output of the first variable delay cell and for providing an output;

a third multiplier for multiplying the output of the first divider with the output of the output of the first band pass filter at 90 degrees phase shift; and a first integrating loop filter for receiving the output of the third multiplier and for providing an input to the first variable delay cell.

5. The apparatus of claim 4 wherein the second delay lock loop further comprises:

a second variable delay cell;

a second divider for receiving an output of the second variable delay cell and for providing an output;

a fourth multiplier for multiplying the output of the second divider with the output of the second band pass filter at 90 degrees phase shift; and a second integrating loop filter for receiving the output of the fourth multiplier and for providing an input to the second variable delay cell.

6. The apparatus of claim 5 and further comprising:

a circuit for generating the clocks generated by the first and second delay lock loops, the circuit including a first clock division mechanism for dividing a frequency of an input clock by an integer.

7. The apparatus of claim 6 wherein the first clock division mechanism divides the input clock by 15.

8. The apparatus of claim 7 and further comprising:

a second clock division mechanism for receiving an output of the first clock division mechanism and for providing an output to the first variable delay cell.

9. The apparatus of claim 8 wherein the second clock division mechanism divides the output of the first clock division mechanism by two.

10. The apparatus of claim 8 and further comprising:

a third clock division mechanism for receiving the output of the first clock division mechanism and for providing an output to the second variable delay cell.

11. The apparatus of claim 10 wherein the second clock division mechanism divides the output of the first clock division mechanism by three.

12. The apparatus of claim 1 and further comprising:

a tuning frequency mechanism connected to the first band pass filter, the second band pass filter, the first low pass filter and the second low pass filter for centering each filter about predetermined frequencies.

13. The apparatus of claim 1 and further comprising:

a first predetermined gain amplifier for receiving the output of the first multiplier and for providing an input to the first low pass filter.

14. The apparatus of claim 13 and further comprising:

a second predetermined gain amplifier for receiving the output of the second multiplier and for providing an input to the second low pass filter.

15. The apparatus of claim 1 and further comprising:

a first voltage gain amplifier connected between the input and the first band pass filter of the first pilot tone demodulation unit;

a second voltage gain amplifier connected between the first band pass filter and the first multiplier;

a third voltage gain amplifier connected between the first low pass filter and the comparator;

a fourth voltage gain amplifier connected between the second band pass filter and the second multiplier; and a fifth voltage gain amplifier connected between the second low pass filter and the comparator.

16. The apparatus of claim 15 and further comprising:

a sixth voltage gain amplifier connected between the second band pass filter and the fourth voltage gain amplifier for receiving the second pilot tone and for providing the second pilot tone with an increased amplitude to the input of the fourth voltage gain amplifier.

* * * * *